United States Patent [19]

Kolkmann et al.

[11] Patent Number: 4,904,459
[45] Date of Patent: Feb. 27, 1990

[54] PROCESS FOR WORKING UP DUSTS WHICH ARE PRODUCED IN THE ELECTROTHERMAL PRODUCTION OF PHOSPHORUS

[75] Inventors: Friedrich Kolkmann, Brühl; Günther Schimmel, Erftstadt, both of Fed. Rep. of Germany; Johannes Scheffer, Vlissingen, Netherlands

[73] Assignee: Hoechst Aktiengesellschaft, Frankfurt, Fed. Rep. of Germany

[21] Appl. No.: 385,492

[22] Filed: Jul. 26, 1989

[30] Foreign Application Priority Data

Aug. 9, 1988 [DE] Fed. Rep. of Germany ....... 3826981

[51] Int. Cl.$^4$ .................. C01B 15/16; C01B 25/26
[52] U.S. Cl. ........................... 423/305; 423/37; 423/43; 423/92; 423/101; 423/309; 423/313; 423/315; 423/323
[58] Field of Search ............... 423/37, 43, 92, 101, 423/305, 309, 313, 315, 323

[56] References Cited

U.S. PATENT DOCUMENTS

| | | | |
|---|---|---|---|
| 1,441,573 | 1/1923 | Franchot et al. | 423/323 |
| 2,020,976 | 11/1935 | Udy | 423/323 |
| 2,050,796 | 8/1936 | Kerschbaum et al. | 423/322 |
| 2,069,225 | 2/1937 | Curtis | 423/323 |
| 2,143,001 | 1/1939 | Curtis et al. | 423/323 |
| 2,162,657 | 6/1939 | Wehrstein | 423/313 |
| 4,299,803 | 11/1981 | Schrödter et al. | 423/313 |
| 4,421,521 | 12/1983 | Barber | 423/323 |
| 4,537,756 | 8/1985 | Röttgen et al. | 423/322 |
| 4,762,697 | 8/1988 | Nield et al. | 423/323 |
| 4,783,328 | 11/1988 | Finley et al. | 423/323 |

FOREIGN PATENT DOCUMENTS 0266597 5/1988 European Pat. Off.

Primary Examiner—John Doll
Assistant Examiner—Wayne A. Langel

[57] ABSTRACT

A process is provided for working up dusts which have been precipitated electrostatically from the gas mixture composed essentially of carbon monoxide and phosphorus vapor produced in the electrothermal production of yellow phosphorus, which process comprises converting the dusts into a calcinate at 300° to 800° C. under oxidizing conditions in a first step, leaching the calcinate with phosphoric acid in a second step, adjusting the pH of the solution in phosphoric acid to 0 to 1.5 with sodium hydroxide solution in a third step, precipitating the sulfides of lead, copper and cadmium from the partially neutralized solution in phosphoric acid by adding sulfide and filtering them off in a fourth step, adjusting the pH of the filtered, partially neutralized solution in phosphoric acid to about 1.5 to 5.0 with sodium hydroxide solution and precipitating zinc sulfide, if necessary by adding further quantities of sulfide, and filtering it off in a fifth step, further neutralizing the sodium phosphate solution, if necessary after expelling excess sulfide, with sodium hydroxide solution and separating it from precipitated calcium compounds in a sixth step, and using the resultant sodium phosphate solution in this form in a known manner to produce sodium phosphate salts.

12 Claims, 1 Drawing Sheet

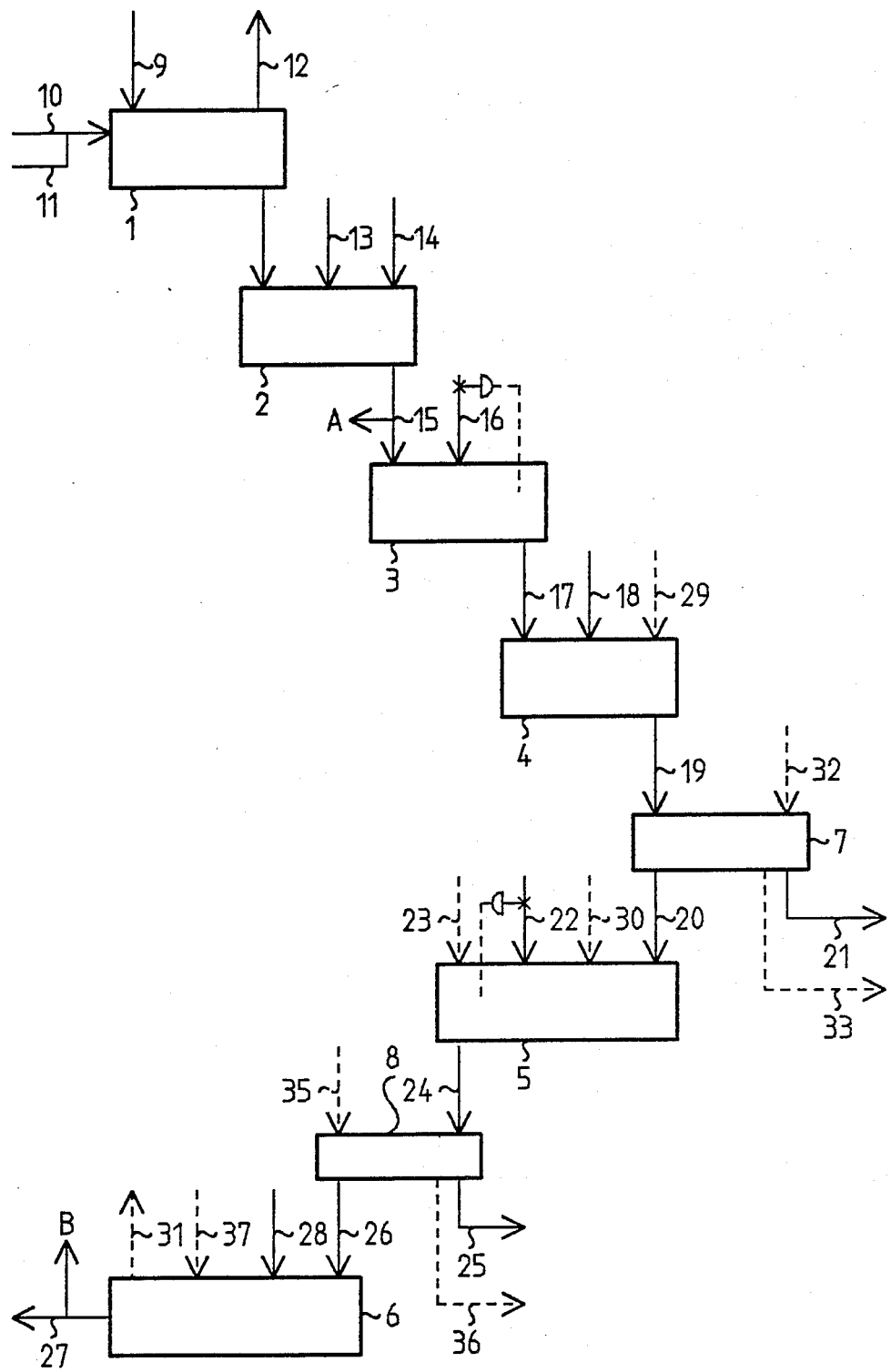

PROCESS FOR WORKING UP DUSTS WHICH ARE PRODUCED IN THE ELECTROTHERMAL PRODUCTION OF PHOSPHORUS

The present invention relates to a process for working up dusts which have been precipitated electrostatically from the gas mixture composed essentially of carbon monoxide and phosphorus vapor produced in the electrothermal production of yellow phosphorus.

Under the reducing conditions of an electrothermal phosphorus furnace, the metallic impurities introduced with the crude phosphate, coke and gravel leave the phosphorus furnace in elementary form or as volatile oxides together with the carbon monoxide and phosphorus vapor. To purify this phosphorus vapor mixture, the impurities are precipitated in electrostatic precipitators, in particular in Cottrell electrostatic precipitators, and removed as so-called Cottrell dust.

The Cottrell dusts contain, in addition to phosphorus and its compounds, also zinc, cadmium, copper, lead and potassium.

According to U.S. Pat. No. 4,537,756, Cottrell dust can be removed and dumped after processing. However, Cottrell dust can also be returned, together with fresh charge materials, to the phosphorus furnace for its content of phosphorus and phosphorus compounds to be economically exploited, but in this process the return of the dust results in an enrichment of the metallic impurities which adversely affect both the operation of the phosphorus furnace and also that of the electrostatic precipitator downstream.

EP No. 0,266,597 A1 is a further development of the procedure of U.S. Pat. No. 4,537,756. The dusts are calcined in an oxidizing manner at 300° to 800° C. in a first step. The calcinate is treated with carbon at 950° to 1200° C. in a further step and the metallic impurities in the dusts are volatilized in this process and consequently removed from the dust. The residue, which is composed of silicates and phosphates, can then be returned to the phosphorus furnace as a feed mix.

A disadvantage of this process is the high technical expenditure which is also responsible for a high expenditure of energy.

The object was therefore posed of working up the dusts produced in the production of phosphorus in a manner such that only small quantities for disposal are produced, the phosphorus compounds present in the dusts are economically exploited and no effluent waters are produced.

According to the invention this is achieved by a process which comprises converting the dusts into a calcinate at 300° to 800° C. under oxidizing conditions in a first step, leaching the calcinate with phosphoric acid in a second step, adjusting the pH of the solution in phosphoric acid to 0 to 1.5 with sodium hydroxide solution in a third step, precipitating the sulfides of lead, copper and cadmium from the partially neutralized solution in phosphoric acid by adding sulfide and filtering them off in a fourth step, adjusting the pH of this filtered, partially neutralized solution in phosphoric acid to about 1.5 to 5.0 with sodium hydroxide solution and precipitating zinc sulfide, if necessary by adding further quantities of sulfide, and filtering it off in a fifth step, further neutralizing the sodium phosphate solution, if necessary after expelling excess sulfide, with sodium hydroxide solution and separating it from precipitated calcium compounds in a sixth step, and using the resultant sodium phosphate solution in this form in a known manner to produce sodium phosphate salts. The process according to the invention may furthermore optionally also be developed in a manner such that (a) the calcinate of the dusts is leached with phosphoric acid produced by combustion of phosphorus or desulfatized wet phosphoric acid containing 10 to 54% by weight, preferably 25 to 35% by weight, of $P_2O_5$ in a quantity by weight of 5 to 20 times, preferably 10 to 15 times;

(b) the calcinate is leached with phosphoric acid at 20° to 100° C., preferably 70° to 80° C., for from 0.5 to 4 hours, preferably 2 to 3 hours;

(c) the pH of the phosphoric acid and sodium phosphate solutions is adjusted with 10 to 50%, in particular 25 to 35%, sodium hydroxide solution;

(d) in the third step, the pH is adjusted to 1;

(e) in the fourth and fifth step, a measured amount of phosphorus pentasulfide and/or sodium sulfide is added in solid or dissolved form as the sulfide in 1 to 3 times the quantity, calculated as the stoichiomeric quantity of the precipitated metal sulfide;

(f) the sulfides are precipitated at 20° to 80° C., preferably at 50° to 70° C., in particular in the presence of filtering aids, preferably of kieselguhr;

(g) the sulfide precipitates are separated at 20° to 80° C. in the presence of filtering aids, in particular kieselguhr;

(h) in the sixth step, the molar ratio is adjusted to Na:P=5:3 and this sodium phosphate solution is used to produce sodium tripolyphosphate;

(i) in the fourth step, lead, copper, cadmium and zinc are precipitated simultaneously as sulfides at a pH of 1.7 to 2.5, in particular 1.9 to 2.1;

(j) before they are calcined, the dusts are mashed with wash waters which have been produced in washing the sulfide precipitates;

(k) the calcium compounds separated in the sixth step are returned to the electrothermal phosphorus production process.

BRIEF DESCRIPTION OF THE DRAWING

The sole FIGURE of the drawing represents a flow diagram of the process according to the invention.

The process according to the invention now achieves a procedure which makes it possible to largely convert the phosphorus constituents of the dusts economically into alkali-metal phosphates and to work up the metallic impurities of the dusts into disposable lead, copper and cadmium sulfide and also into zinc sulfide which can be utilized for producing zinc.

The process according to the invention is explained with reference to the accompanying drawing:

The dusts precipitated in the electrostatic precipitator are mashed in water, filtered off and supplied as filter cake via the feed line 9 to the rotary furnace 1 which is heated by means of a gas burner. The gas burner is fed with natural gas via the gas feed line 10 and via the air feed line 11. The exhaust gases escape via the chimney 12. The calcined oxidized dusts are conveyed via the chute 13 to the rubberized dissolving tank 2. A measured amount of phosphoric acid is added via the phosphoric acid line 14. The solution in phosphoric acid produced when the calcinate is leached is fed via the pipeline 15 to the stirred tank 3 after insoluble A has been separated off and returned to the phosphorus furnace. The sodium hydroxide solution flows into the stirred tank 3 via the sodium hydroxide line 16 in a controlled manner based on the pH. Via the drainage line 17, the partially neutralized solution in phosphoric acid is stirred together with measured amounts of alkali-metal or phosphorus sulfide added through the pipe connection 18 in the precipitation tank 4. A filtering aid is added, if necessary, via the chute 29. The suspension of heavy-metal sulfides is conveyed via pipeline 19 onto a rotary filter 7 which is coated with a precoating layer. The lead, copper and calcium sulfides filtered off are washed on the rotary filter 7 with water 32 and drawn off via the discharge 21. The wash water is available for mashing the dusts via the wash water line 33. The filtered, partially neutralized solution in phosphoric acid flows through the drainage connection 20 into the post-precipitation tank 5 into which sodium hydroxide solution flows via the sodium hydroxide line 22, in a controlled manner based on the pH of the tank content. Additional alkali-metal or phosphorus sulfide is fed in via the pipe connection 23, additional filtering aid via the chute 30. The suspension of zinc sulfide is conveyed via the pipeline 24 onto a rotary filter 8 which is coated with a precoating layer. The zinc sulfide filtered off is removed after washing with water 35 via the discharge 25. The wash water is also available via the wash water line 36 for mashing the dusts. The filtered sodium phosphate solution flows through the drainage connection 26 into the neutralization tank 6. After the blowing-out 37 of the sodium phosphate solution to remove excess sulfide with air—the waste air escapes via the chimney line 31—the quantity of sodium hydroxide solution required for the neutralization is added in measured amounts via the sodium hydroxide line 28. The suspension of sodium phosphate produced is removed from the neutralization tank 6 and filtered. The filter cake B is returned to the phosphorus furnace. The resultant sodium phosphate solution is drawn off via the drain 27 for the purpose of sodium salt production.

We claim:

1. A process for working up dusts which have been precipitated electrostatically from the gas mixture comprising carbon monoxide and phosphorus vapor produced in the electrothermal production of yellow phosphorus, which process comprises converting the dusts into a calcinate at 300° to 800° C. under oxidizing conditions in a first step, leaching the calcinate with phosphoric acid in a second step, adjusting the pH of the solution in phosphoric acid to 0 to 1.5 with sodium hydroxide solution in a third step, precipitating the sulfides of lead, copper and cadmium from the partially neutralized solution in phosphoric acid by adding sulfide and filtering them off in a fourth step, adjusting the pH of the filtered, partially neutralized solution in phosphoric acid to about 1.5 to 5.0 with sodium hydroxide solution and precipitating zinc sulfide, optionally by adding further quantities of sulfide, and filtering it off in a fifth step, further neutralizing the sodium phosphate solution, optionally after expelling excess sulfide, with sodium hydroxide solution and separating it from precipitated calcium compounds in a sixth step, and using the resultant sodium phosphate solution in this form to produce sodium phosphate salts.

2. The process as claimed in claim 1, wherein the calcinate of the dusts is leached with phosphoric acid produced by combustion of phosphorus or desulfatized wet phosphoric acid containing 10 to 54% by weight of $P_2O_5$ in a quantity by weight of 5 to 20 times.

3. The process as claimed in claim 1, wherein the calcinate is leached with phosphoric acid at 20° to 100° C. for from 0.5 to 4 hours.

4. The process as claimed in claim 1, wherein the pH of the phosphoric acid and sodium phosphate solutions is adjusted with 10 to 50% sodium hydroxide solution.

5. The process as claimed in claim 1, wherein, in the third step, the pH is adjusted to 1.

6. The process as claimed in claim 1, wherein, in the fourth and fifth step, a measured amount of phosphorus pentasulfide or sodium sulfide is added in solid or dissolved form as the sulfide in 1 to 3 times the quantity, calculated as the stoichiometric quantity of the precipitated metal sulfide.

7. The process as claimed in claim 1, wherein the sulfides are precipitated at 20° to 80° C. in the presence of filtering aids.

8. The process as claimed in claim 7, wherein the sulfide precipitates are separated at 20° to 80° C. in the presence of kieselguhr.

9. The process as claimed in claim 1, wherein, in the sixth step, the molar ratio is adjusted to Na:P=5:3 and this sodium phosphate solution is used to produce sodium tripolyphosphate.

10. The process as claimed in claim 1, wherein, before they are calcined, the dusts are mashed with wash waters which have been produced in washing the sulfide precipitates.

11. The process as claimed in claim 1, wherein the calcium compounds separated in the sixth step are returned to the electrothermal phosphorus production process.

12. A process for working up dusts which have been precipitated electrostatically from the gas mixture comprising carbon monoxide and phosphorus vapor produced in the electrothermal production of yellow phosphorus, which process comprises converting the dusts into a calcinate at 300° to 800° C. under oxidizing conditions in a first step, leaching the calcinate with phosphoric acid in a second step, adjusting the pH of the solution in phosphoric acid to 1.7 to 2.5 with sodium hydroxide solution in a third step, precipitating the sulfides of lead, copper, cadmium and zinc from the partially neutralized solution in phosphoric acid by adding sulfide, and filtering them off in a fourth step, further neutralizing the sodium phosphate solution, optionally after expelling excess sulfide, with sodium hydroxide solution and separating it from precipitated calcium compounds in a fifth step, and using the resultant sodium phosphate solution in this form to produce sodium phosphate salts.

* * * * *